No. 874,108. PATENTED DEC. 17, 1907.
G. B. McKINNEY.
VALVE ATTACHMENT FOR ENGINES.
APPLICATION FILED FEB. 6, 1905.

Witnesses:
Chas. F. Bassett
M. A. Milord

Inventor
George B. McKinney
By
Frederick Benjamin
Atty

UNITED STATES PATENT OFFICE.

GEORGE B. McKINNEY, OF BARRY, ILLINOIS.

VALVE ATTACHMENT FOR ENGINES.

No. 874,108.  Specification of Letters Patent.  Patented Dec. 17, 1907.

Application filed February 6, 1905. Serial No. 244,364.

*To all whom it may concern:*

Be it known that I, GEORGE B. McKINNEY, citizen of the United States, residing at Barry, in the county of Pike and State of Illinois, have invented certain new and useful Improvements in Valve Attachments for Engines, of which the following is a specification.

My invention relates to improvements in attachments for gas or gasolene engines, and the especial object of such improvements, is to provide means to control the intake valve so that it will not leak or admit gas to be wasted through the exhaust valve.

When a gas engine has the exhaust port open, the intake valve, being supported or held only by a weak spring is unable to withstand the suction of the piston and opens slightly thus admitting gas which is blown through the exhaust port without being ignited and is therefore wasted. If the spring on the intake valve is made stout enough to withstand the suction created by the piston while the exhaust port is open, it would be too strong to allow the intake valve to admit the proper charge. My invention is designed to overcome this difficulty and thereby save the gas which is now wasted.

In this application I have shown my intake valve controlling attachment as adapted to and operated by the rod that works the lever that opens the exhaust port but I do not wish to be limited to this particular method of applying or operating my attachment.

Figure 1:
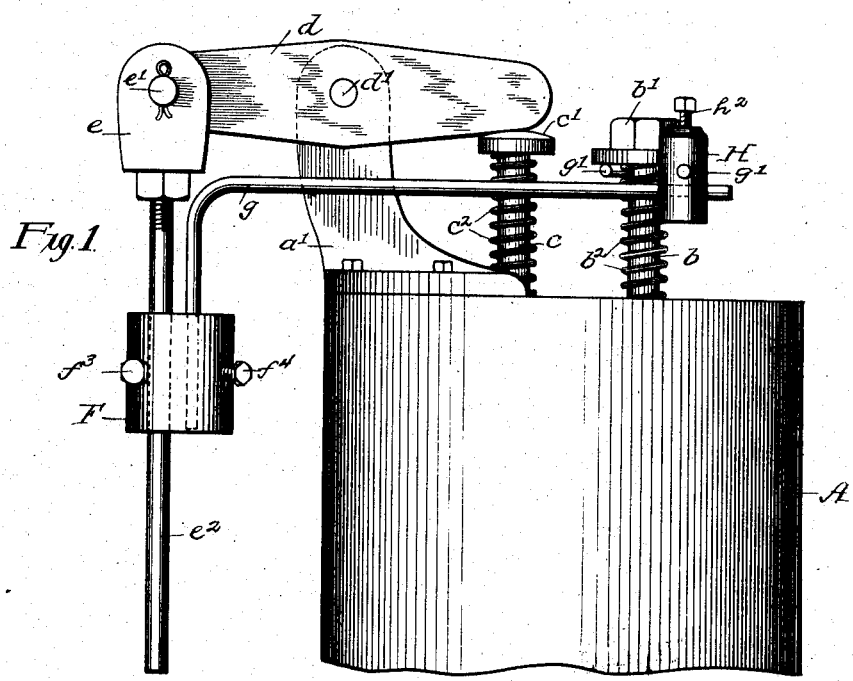
Figure 2:
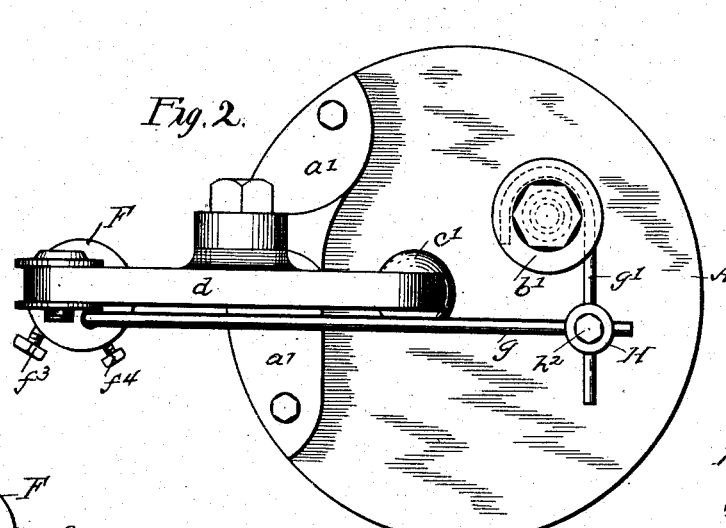
Figure 6:
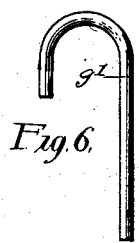
Figure 3:
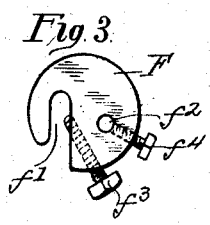
Figure 4:
Figure 5:
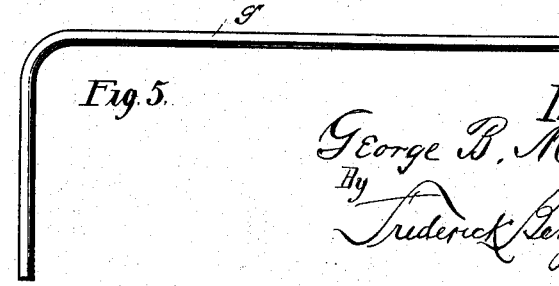

In the accompanying drawing which forms a part of this application:—Figure 1 is an elevation showing my invention applied to the cylinder of a gas engine, a portion only of the cylinder being shown; Fig. 2 is a top-plan view of the parts shown in Fig. 1; Fig. 3 is a top-plan view showing the device used for connecting my invention to the valve-operating rod; Figs. 4, 5 and 6 are details of parts of my device.

Referring to the drawing in detail, A represents a cylinder of a gas or gasolene engine, to which is attached in any suitable manner an intake valve $b$ and an exhaust valve $c$ which valves may be of any preferred construction, arrangement or operation as same are not parts of my invention. I have shown the valve stem $b$ provided with an expansion coil spring $b^2$ and with a nut $b^1$ secured to the upper end of the stem against which the spring bears and I have shown the valve-stem $c$ provided with an expansion coil-spring $c^2$ and with a button $c^1$ on its upper end against which the spring bears, all of which are well known features in such devices.

Secured to the head of the cylinder is a standard $a^1$ in the upper end of which is a pivot $d^1$ on which is mounted a lever $d$ one end of which bears on the button of the valve-stem $c$, and the other end is pivotally connected with a pin $e^1$ in the rod-coupling $e$, the latter having a threaded connection with the rod $e^2$ which is operated by the engine in any suitable or approved manner and serves, through the lever, to operate the exhaust port valve $c$.

Mounted on the rod $e^2$ is a collar F which is cylindrical in its general form, has an open vertical slot $f^1$ cut therein, and a vertical hole $f^2$ drilled therethrough. A set-screw $f^3$ has a threaded engagement with a suitable opening which extends through the collar and terminates near the bottom of the slot $f^2$. A set-screw $f^4$ has a similar engagement with an opening which extends from the side of the collar inwardly to the hole $f^2$. The collar is mounted on the rod $e^2$ by inserting the latter in the slot $f^1$ and screwing up the screw $f^3$ until its inner end impinges firmly on the rod. In the hole $f^2$ of the collar I insert the vertical member or portion of the rod $g$ and secure it by screwing up the screw $f^4$ until it impinges on the rod. The horizontal portion of the rod is arranged to extend over the cylinder A and its free end terminates near the intake valve stem nut $b^1$.

Mounted near the free end of the rod $g$ is a coupling H, consisting of a small cylindrical steel casting having drilled therethrough at right-angles to each other, two openings $h^1$, $h^3$, respectively, and a threaded vertical opening, the inner end of which communicates with the opening $h^3$. A set-screw $h^2$ has a threaded engagement with the vertical opening in said coupling and the latter is attached to the rod $g$ by passing the latter through the opening $h^3$. A rod $g^1$ formed with a hooked end, as shown in Fig. 6 is attached to the coupling by having its straight portion inserted through the opening $h^1$, and the hooked portion is so arranged as to loosely embrace the valve-stem $b$ and its spring $b^2$ and rest against the base of the nut $b^1$.

From the construction above described, it will be apparent that the upward movement of the rod $e^2$ will be communicated to the rod $g^1$ through the rod $g$ and coupling H, and thereby increase the pressure of the hooked end of the rod $g^1$ against the under side of said nut, while the downward movement of the rod $e^2$ will depress the rod $g^1$ and relieve the nut of pressure except that exerted by the spring $b^2$. As the rod $e^2$ moves upward at the same time that extra force is needed to hold the intake valve more firmly on its seat to withstand the suction caused by the downward stroke of the piston-head, while the exhaust valve is open, the extra force or pressure is furnished as described at the time needed, and when the exhaust valve is being closed by the expansion of its spring, the rod $e^2$ is moving downwardly, thus releasing pressure from the intake valve and permitting its spring to work normally.

It will be noted that I have so constructed the several parts of my improved attachment that it may be attached without changing the engine or loosening any of the nuts or parts. It will also be observed that the collar F is adjustable on the rod $e^2$, and the coupling H is adjustable on the rods $g$ and $g^1$, thus providing for all ordinary conditions met with in different sizes of engines.

Having thus described my invention what I claim as new and desire to secure by Letters Patent, is:—

1. In a gas-engine, the combination with a cylinder provided with inlet and exhaust ports and valves therefor, the stems of said valves projecting from the cylinder, a lever having one end bearing upon and adapted to open the exhaust valve, a reciprocating rod operating said lever, and adjustable means rigidly connected with said rod and operated thereby, for holding the inlet valve on its seat when the exhaust valve is opened.

2. In a gas-engine, the combination with a cylinder provided with inlet and exhaust ports and valves therefor, the stems of said valves projecting from the cylinder, a lever pivoted on said cylinder and adapted to open the exhaust valve, a rod operating said lever, a collar detachably secured to said rod, and means connected with said collar for holding the inlet valve on its seat when the exhaust valve is opened, said means comprising elements adjustable vertically and horizontally relative to said rod.

3. In a gas-engine, the combination with a cylinder provided with inlet and exhaust ports and spring-held valves therefor, the stems of said valves projecting from the cylinder, a lever adapted to open the exhaust valve, a rod operating said lever, a collar detachably and adjustably mounted on said rod and detachable and adjustable means connected with said collar and engaging the stem of the intake valve whereby the latter will be held on its seat when the exhaust valve is opened.

4. In a gas-engine, the combination with a cylinder provided with inlet and exhaust ports and spring-held valves therefor, the stems of said valves projecting from the cylinder, a rocking lever mounted on said cylinder and having one end bearing on the stem of the exhaust valve and adapted to depress the same against the tension of the valve spring, a rod connected with one end of said lever, a collar having an open slot therein to receive said rod, means for adjusting said collar on said rod, an angular rod adjustably mounted in said collar, a coupling member adjustably mounted on said angular rod, a hook member secured in said coupling and adapted to hold the inlet-valve on its seat in the manner and for the purpose set forth.

In testimony whereof I affix my signature in presence of two witnesses.

GEORGE B. McKINNEY.

Witnesses:
E. L. PARMER,
J. K. CRAWFORD.